United States Patent
Hirst et al.

(10) Patent No.: US 11,288,077 B2
(45) Date of Patent: Mar. 29, 2022

(54) BOOT IMAGE LOADING

(71) Applicant: Hewlett-Packard Development Company, L.P., Spring, TX (US)

(72) Inventors: Bartley Mark Hirst, Boise, ID (US); Brian C Mayer, Boise, ID (US); Hernan Ildefonso Gutierrez-Vazquez, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 143 days.

(21) Appl. No.: 16/637,893

(22) PCT Filed: Sep. 26, 2017

(86) PCT No.: PCT/US2017/053417
§ 371 (c)(1),
(2) Date: Feb. 10, 2020

(87) PCT Pub. No.: WO2019/066773
PCT Pub. Date: Apr. 4, 2019

(65) Prior Publication Data
US 2020/0167170 A1    May 28, 2020

(51) Int. Cl.
*G06F 9/44* (2018.01)
*G06F 9/445* (2018.01)
*G06F 9/4401* (2018.01)

(52) U.S. Cl.
CPC .......... *G06F 9/4406* (2013.01); *G06F 9/4401* (2013.01); *G06F 9/4416* (2013.01); *G06F 9/4418* (2013.01)

(58) Field of Classification Search
None
See application file for complete search history.

(56) References Cited

U.S. PATENT DOCUMENTS

| | | | |
|---|---|---|---|
| 6,098,158 A * | 8/2000 | Lay | G06F 9/4401 711/161 |
| 9,354,895 B2 | 5/2016 | Lim et al. | |
| 9,367,333 B2 | 6/2016 | Wen et al. | |
| 10,394,570 B2 * | 8/2019 | Baik | G06F 9/442 |
| 2002/0118384 A1 | 8/2002 | Isshiki | |
| 2003/0184794 A1 | 10/2003 | Stringham | |
| 2003/0226005 A1 | 12/2003 | Wu | |
| 2006/0242398 A1 | 10/2006 | Fontijn et al. | |
| 2010/0058045 A1 | 3/2010 | Borras et al. | |

(Continued)

OTHER PUBLICATIONS

Huber, M el al., a Flexible Framework for Mobile Device Forensics Based on Cold Boot Attacks, Aug. 11, 2016, https://jiseurasipjournals.springeropen/ ~ 22 pages.

*Primary Examiner* — Tanh Q Nguyen
(74) *Attorney, Agent, or Firm* — Perry + Currier Inc

(57) ABSTRACT

An example printer includes a non-transitory computer-readable medium. The printer also includes a boot engine communicatively coupled to the non-transitory computer-readable medium. The boot engine is to load a boot image into a first portion of the non-transitory computer-readable medium. The boot image includes data from an operational state of an operating system. The printer includes a configuration engine. The configuration engine is to program a second portion of the non-transitory computer-readable medium while the boot engine is loading the boot image.

14 Claims, 6 Drawing Sheets

(56) References Cited

U.S. PATENT DOCUMENTS

| | | | |
|---|---|---|---|
| 2010/0100719 A1* | 4/2010 | Chen | G06F 1/3203 713/2 |
| 2011/0213954 A1* | 9/2011 | Baik | G06F 9/4418 713/2 |
| 2013/0042097 A1* | 2/2013 | Baik | G06F 9/4401 713/2 |
| 2014/0129820 A1* | 5/2014 | Lim | G06F 9/4401 713/2 |
| 2014/0244989 A1* | 8/2014 | Hiltgen | G06F 9/4416 713/2 |
| 2015/0124287 A1 | 5/2015 | Wen | |
| 2020/0167170 A1* | 5/2020 | Hirst | G06F 9/4406 |

* cited by examiner

FIG. 3  300

Load a Boot Loader into a Cache of a First Processor
302

Determine Whether a Boot Image Exists That Includes Data from an Operational State of an Operating System
304

Based on the Boot Image Existing, Load the Boot Image into a First Portion of a Memory
306

Program a Second Portion of the Memory Using a Second Processor
308

BOOT IMAGE LOADING

BACKGROUND

A printer may form a print product (e.g., an image, a three dimensional object, etc.) on a print target (e.g., a medium, a print bed, etc.) by delivering a printing substance to the print target. The printing substance may be toner, a printing fluid (e.g., ink), a powder, a filament, or the like. The printer may receive data describing the print product to be formed, and the printer may form the print product based on the data. The printer may perform additional functions, such as scanning documents or objects, transmitting data about documents or objects (e.g., via email, fax, etc.), storing data about documents or objects (e.g., to a removable or non-removable storage device), or the like.

BRIEF DESCRIPTION OF THE DRAWINGS

FIG. 3 is a flow diagram of an example method to quickly transition to an operational state.

DETAILED DESCRIPTION

The printer may include an operating system and an application. The operating system or the application may perform the various functions of the printer. The operating system or the application may be stored in a persistent storage device in a non-operational state. The printer may perform a boot operation to place the printer in an operational state and load the operating system or the application into main memory in an operational state. As used herein, the term "operational state" refers to a state in which a system or instructions executing on the system are able to perform a task requested by a user or another system (other than a request to power on the system). For example, the system or instructions may be able to perform the requested task without performing additional operations to get ready to perform the task. The system or instructions may be able to perform the requested task without delaying receipt of the request to perform the task or without delaying execution of instructions to perform the task.

Placing the printer in a low power state may conserve energy when the printer is not in use. When a user would like the printer to perform a task, the printer may transition from the low power state to an operational state. In an example, the printer may enter the low power state by turning off, which may reduce power usage of the printer to zero or near zero. The printer may boot to transition from the off state to the operational state. Booting the printer to an operational state may take about 30 seconds, a minute, two minutes, three minutes, five minutes, 10 minutes, or the like. A user may wait for the printer to boot before the user's task is performed. The user may desire to conserve energy in the low power state without waiting for the printer to boot when a task is to be performed.

Data from main memory may be saved to a persistent storage device when the printer transitions to the low power state. The printer may transfer the data from the persistent storage device to main memory when transitioning to the high power state. The time to transfer the data from the persistent storage device to main memory may be long enough that the printer may save little time over performing a full boot. For example, a large amount of data may be saved, so the printer may take time to transfer the large amount of data. The user experience may be improved if the printer could enter the operational state more quickly than when performing a full boot or transferring main memory data from the persistent storage device.

Figure 1:
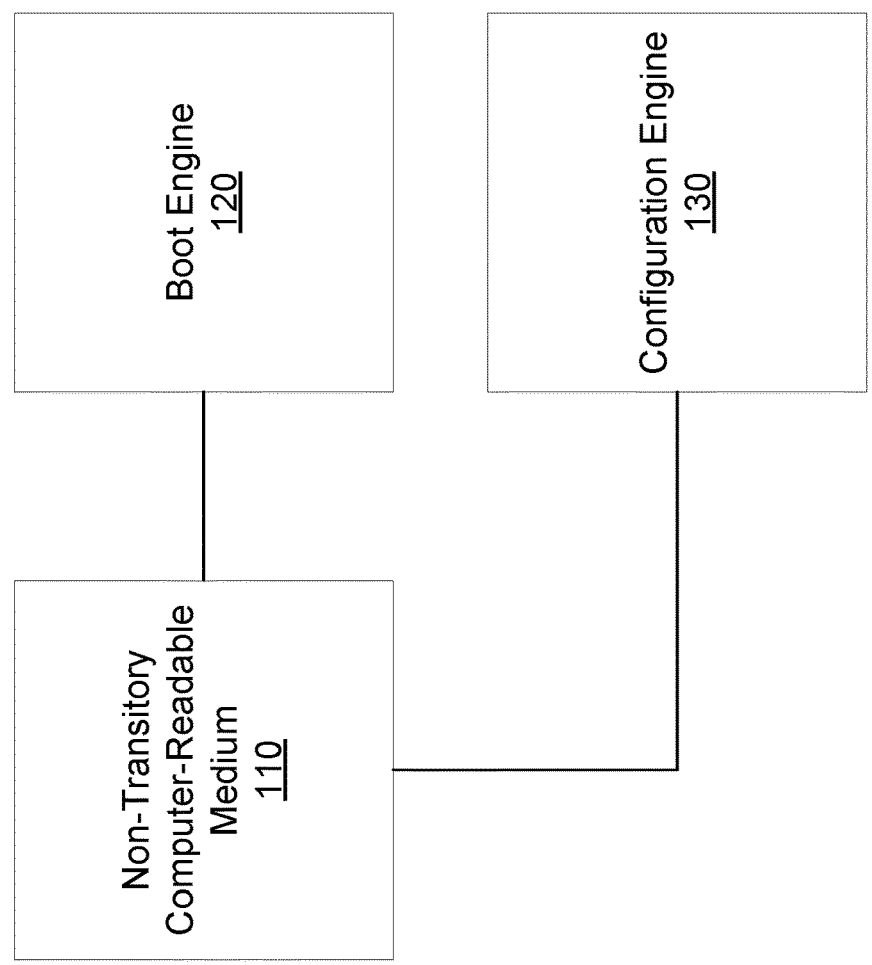
FIG. 1 is a block diagram of an example system to quickly transition to an operational state.

FIG. 1 is a block diagram of an example system 100 to quickly transition to an operational state. The system 100 may include a non-transitory computer-readable medium 110. The computer-readable medium 110 may be a non-transitory computer-readable medium, such as a volatile computer-readable medium (e.g., volatile random access memory (RAM), a processor cache, a processor register, etc.), a non-volatile computer-readable medium (e.g., a magnetic storage device, an optical storage device, a paper storage device, flash memory, read-only memory, non-volatile RAM, etc.), and/or the like.

The system 100 may include a boot engine 120. The boot engine 120 may be communicatively coupled to the non-transitory computer-readable medium 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as RAM, a hard-disk or solid-state drive, resistive memory, or optical media such as a digital versatile disc (DVD), and/or executed or interpreted by a processor), or hardware and software hosted at hardware. The boot engine 120 may load a boot image into a first portion of the non-transitory computer-readable medium. For example, the boot engine 120 may copy data from the boot image to the first portion of the non-transitory computer-readable medium for at least temporary storage. The boot image may include data from an operational state of an operating system. For example, the data may include data saved when the operating system was in the operational state.

The system 100 may include a configuration engine 130. The configuration engine 130 may program a second portion of the non-transitory computer-readable medium while the boot engine 120 is loading the boot image. For example, the boot image may not include data for the second portion of the memory, but the operating system or an application may use the second portion of the non-transitory computer-readable medium when the operating system or the application is in operation. Accordingly, the configuration engine 130 may program the second portion of the non-transitory computer-readable medium so that it is usable by the operating system or the application. In an example, the system 100 includes a printer, which includes the non-transitory computer-readable medium 110, the boot engine 120, and the configuration engine 130.

Figure 2:
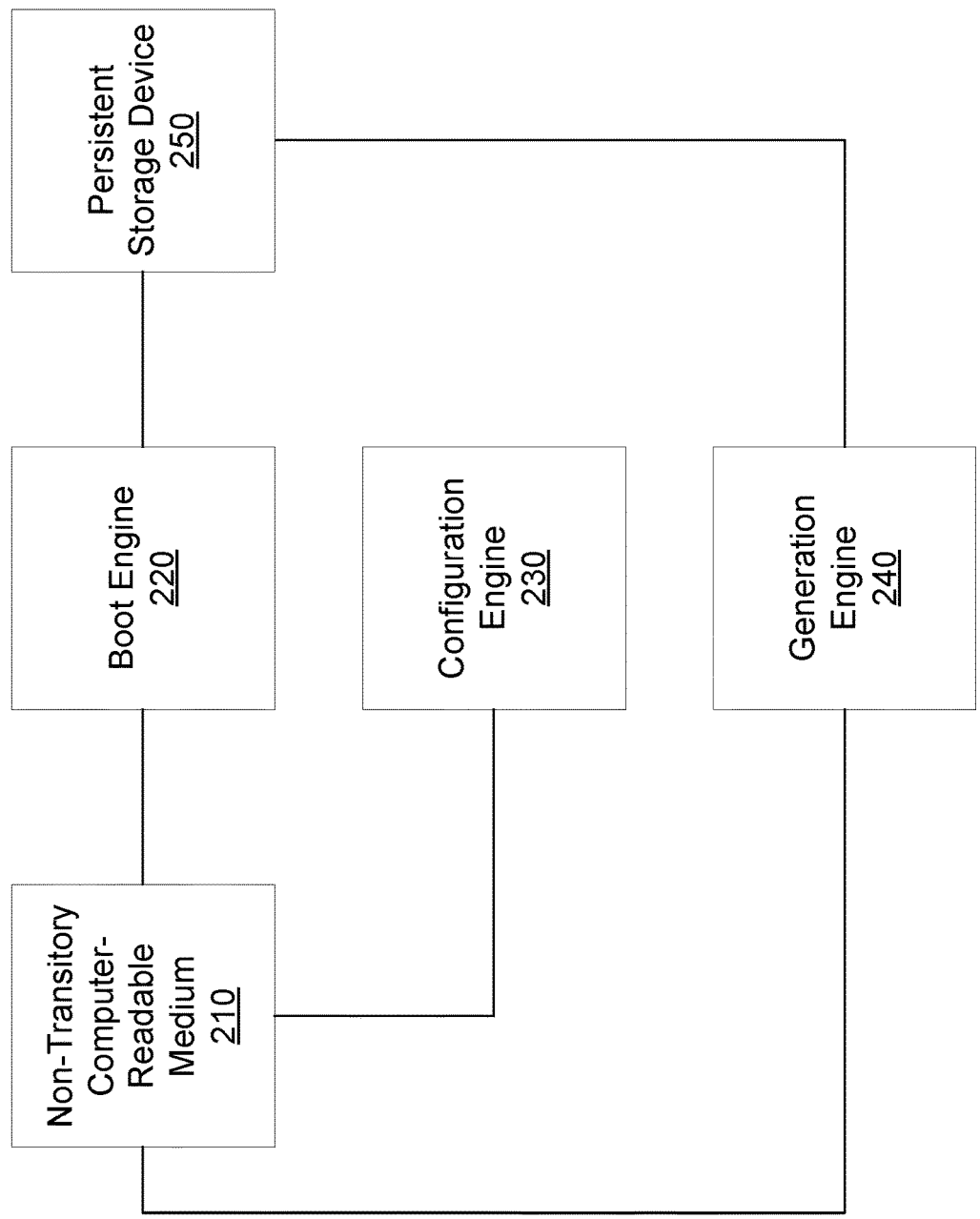
FIG. 2 is a block diagram of another example system to quickly transition to an operational state.

FIG. 2 is a block diagram of another example system 200 to quickly transition to an operational state. The system 200 may include a non-transitory computer-readable medium 210. The non-transitory computer-readable medium 210 may act as a main memory for the system 200. Accordingly, when the system 200 is operating, the non-transitory computer-readable medium 210 may include data used by the system 200 for operation, such as temporary data, permanent data, or the like.

The system 200 may also include a boot engine 220. The boot engine 220 may be communicatively coupled to the non-transitory computer-readable medium 210. The boot engine 220 may load a boot image into a first portion of the non-transitory computer-readable medium 210. For example, the boot engine 220 may also be communicatively coupled to a persistent storage device 250. The persistent storage device 250 may store the boot image, and the boot engine 220 may load the boot image by copying the boot image from the persistent storage device 250 to the first portion of the non-transitory computer-readable medium 210. In an example, the boot engine 220 may copy the boot image from the persistent storage device 250 to the non-transitory computer-readable medium 210. The boot engine 220 may perform a sector-by-sector copy of the boot image.

The boot image may include data from an operational state of a basic input/output system (BIOS), an operating system, an application (e.g., a plurality of applications for performing different tasks for the system 200), or the like. For example, the boot image may include data used by the BIOS, the operating system, or the application when operating. In some examples, the boot image may also include register settings for a processor (e.g., a central processing unit (CPU)). The boot engine 220 may load the register settings from a first part of the boot image, for example, to the processor, and the boot engine 220 may load a second part of the boot image into the first portion of the non-transitory computer-readable medium 210. The second part may include the data used by the BIOS, the operating system, or the application when operating.

The boot engine 220 may determine whether the boot image exists prior to loading the boot image into the first portion of the non-transitory computer-readable medium 210. For example, the boot engine 220 may read an indication of whether the boot image exists (e.g., a flag, an indication of a location of the boot image, etc.) and determine whether the boot image exists based on the indication. If the boot image does not exist, the boot engine 220 may perform a full boot without loading the boot image, or a new boot image may be generated. During the full boot, the boot engine 220 may execute instructions to generate the data to populate the non-transitory computer-readable medium 210 and place the operating system, the application, etc. in the operational state. If the boot image does exist, the boot engine 220 may load the boot image without executing additional instructions to generate the data loaded into the non-transitory computer-readable medium 210.

The boot engine 220 may operate out of a processor cache (e.g., a CPU cache) when loading the boot image into the first portion of the non-transitory computer-readable medium 210. Because the boot engine 220 is loading data into the non-transitory computer-readable medium 210, operating out of the processor cache may prevent the boot engine 220 from attempting to write data to a memory location containing boot engine instructions being or to be executed. After the boot engine 220 has finished loading the boot image, the processor cache may be used to store instructions or data from the BIOS, the operating system, the application, or the like, and the boot engine instructions may be overwritten or deleted.

The system 200 may include a configuration engine 230. The configuration engine 230 may be communicatively coupled to the non-transitory computer-readable medium 210. The boot engine 220 and the configuration engine 230 may be communicatively coupled to the non-transitory computer-readable medium 210 by a shared bus, by separate busses, or the like. The configuration engine 230 may program a second portion of the non-transitory computer-readable medium 210 while the boot engine 220 is loading the boot image. For example, the operating system or the application may expect a particular memory allocation structure in the second portion of the non-transitory computer-readable medium 210. It may be time consuming for the boot engine 220 to allocate the memory in the way expected by the operating system or the application, for example, using a CPU. The configuration engine 230 may be able to efficiently program the second portion of the non-transitory computer-readable medium 210 to have the expected allocation structure. For example, the configuration engine 230 may program the second portion of the non-transitory computer-readable medium 210 with a predetermined allocation structure. In an example, the configuration engine 230 may allocate the memory but program the contents of the allocated memory to be blank. The configuration engine 230 may program the contents to be blank by programming the allocated memory with all zeroes, all ones, or the like. In some examples, the configuration engine 230 may allocate the memory according to the predetermined allocation structure but leave the allocated memory unchanged (e.g., leave the allocated memory with its previous values that can be overwritten later).

The configuration engine 230 may include a dedicated circuit to program the second portion of the non-transitory computer-readable medium 210. The dedicated circuit may include a special purpose processor, such as an ASIC, an FPGA, a programmable array logic (PAL), a programmable logic array (PLA), a programmable logic device (PLD), etc. The dedicated circuit may be specifically designed to quickly program the non-transitory computer-readable medium 210 with the predetermined allocation structure. For example, the dedicated circuit may be able to program the non-transitory computer-readable medium 210 with the predetermined allocation structure with minimal or no clock cycles to compute the predetermined allocation structure or without copying the predetermined allocation structure from the persistent storage device 250.

The boot engine 220 and the configuration engine 230 may completely boot the operating system and the application by loading the boot image and programming the second portion of the non-transitory computer-readable medium 210. For example, there may not be additional actions to be taken by the boot engine 220 or the configuration engine 230 to place the system 200 in an operational state. There may not be additional or suspended processes, drivers, or applications to execute, and there may not be peripherals, devices, or file systems to mount. The system 200 may respond to user or network inputs and perform requested tasks without performing additional operations to ready the system 200 to receive the inputs or perform the tasks, without delaying receipt of the inputs or requests to perform tasks, or without delaying performance of the tasks.

The system 200 may include a generation engine 240. The generation engine 240 may generate a boot image to be loaded to the non-transitory computer-readable medium 210 during booting. For example, the generation engine 240 may detect a change in a hardware configuration of the system 200. The change may include adding or removing a device to the system 200, such as the addition or removal of a tray to or from a printer. The generation engine 240 may detect that firmware, the operating system, or the application has been updated or changed (e.g., based on a version number, a hash value, or the like). In some examples, the generation engine 240 may cause the boot engine 220 to reboot the system 200 with a full boot in response to detecting the change. For example, the generation engine 240 may clear the indication that the boot image exists or delete the boot image and cause the boot engine 220 to reboot the system 200.

Based on detection of the change, the generation engine 240 may determine which data is included in the first portion and the second portion of the non-transitory computer-readable medium 210. For example, the generation engine 240 may determine which data can be discarded and replaced by the predetermined allocation structure and determine which data to include in the boot image. The generation engine 240 may identify the first portion based on determining the location of the BIOS data, operating system data, the application data, etc. to be kept and may determine the remaining data corresponds to the second portion. The generation engine 240 may identify the second portion based on determining the location of data that can be discarded and may determine the remaining data corresponds to the first portion.

In an example, the second portion of the non-transitory computer-readable medium 210 may include security data (e.g., keys, tokens, etc.), temporary data (e.g., recent documents, temporary settings, etc.), user data, etc. For example, during use of the system, the user may generate the security data, temporary data, user data, etc. Discarding the security data may reduce the risk of the data becoming compromised. Discarding the temporary and user data may reduce the size of the boot image. In addition, the system 200 may be able to enter an operational state without the security, temporary, and user data. The generation engine 240 may determine which data is included in the second portion of the non-transitory computer-readable medium 210 by determining the portion of the non-transitory computer-readable medium 210 containing temporary data, security data, user data, or the like.

The generation engine 240 may store data from the first portion of the non-transitory computer-readable medium 210 to persistent storage as the boot image without storing data from the second portion of the non-transitory computer-readable medium 210 to the boot image. For example, the generation engine 240 may save data from the first portion of the non-transitory computer-readable medium 210 to the persistent storage device 250 as the boot image. The generation engine 240 may format the boot image so that it can be loaded by the boot engine 220. For example, the generation engine 240 may perform a sector-by-sector copy from the non-transitory computer-readable medium 210 to the persistent storage device 250. The generation engine 240 may ignore the second portion of the non-transitory computer-readable medium 210 when generating the boot image. In some examples, the non-transitory computer-readable medium 210 may store register settings in a first part of the boot image and data from the first portion of the non-transitory computer-readable medium 210 in a second part of the boot image. In an example, the generation engine 240 may operate out of a processor cache (e.g., a CPU cache) when storing the data as the boot image to prevent change to the non-transitory computer-readable medium 210 while storing the data or to prevent booting into a state in which the generation engine 240 is operating. The generation engine 240 may set the indication to indicate that the boot image exists. In an example, the generation engine 240 may perform the determining of the first and second portion and the storing of the data as the boot image after the boot engine 220 has rebooted the system 200 with a full boot. In some examples, the system 200 may not include a generation engine 240, and the boot image may instead be determined remotely and transmitted to the system 200 (e.g., transmitted with updates to software, firmware, or the like). In an example, the system 200 includes a printer, which includes the non-transitory computer-readable medium 210, the boot engine 220, the configuration engine 230, the generation engine 240, and the persistent storage device 250.

FIG. 3 is a flow diagram of an example method 300 to quickly transition to an operational state. At block 302, the method 300 may include loading a boot loader into a cache of a first processor. For example, the boot loader may include a plurality of instructions executable by the first processor, and the instructions may be moved or copied into the cache of the first processor. The boot loader may be a primary bootloader, a secondary bootloader, or the like.

At block 304, the method 300 may include determining, using the boot loader executing on the first processor, whether a boot image exists that includes data from an operational state of an operating system. For example, the first processor may execute the boot loader out of the cache of the first processor. In an example, determining whether the boot image exists may include checking a store device for the boot image, determining whether an indicator that the boot image exists is set, or the like. The boot image may include data used to maintain the operating system in the operational state.

At block 306, the method 300 may include based on the boot image existing, loading the boot image into a first portion of a memory. For example, loading the boot image may include moving or copying the boot image into the first portion of the memory. In an example, the boot loader operating out of the cache of the first processor may load the boot image into the first portion of the memory. The memory may include a non-transitory computer-readable medium, such as a volatile computer-readable medium, a non-volatile computer-readable medium, or the like.

At block 308, the method 300 may include programming a second portion of the memory using a second processor. For example, the second processor may program the second portion of the memory while the first processor is loading the boot image into the first portion of the memory, while the first processor is performing a boot operation, or the like. Programming the second portion of the memory may include storing data in the memory. Referring to FIG. 1, in an example, the non-transitory computer-readable medium 110 may be the memory, the boot engine 120 may perform blocks 302, 204, or 306, and the configuration engine 130 may perform block 308.

Figure 4:
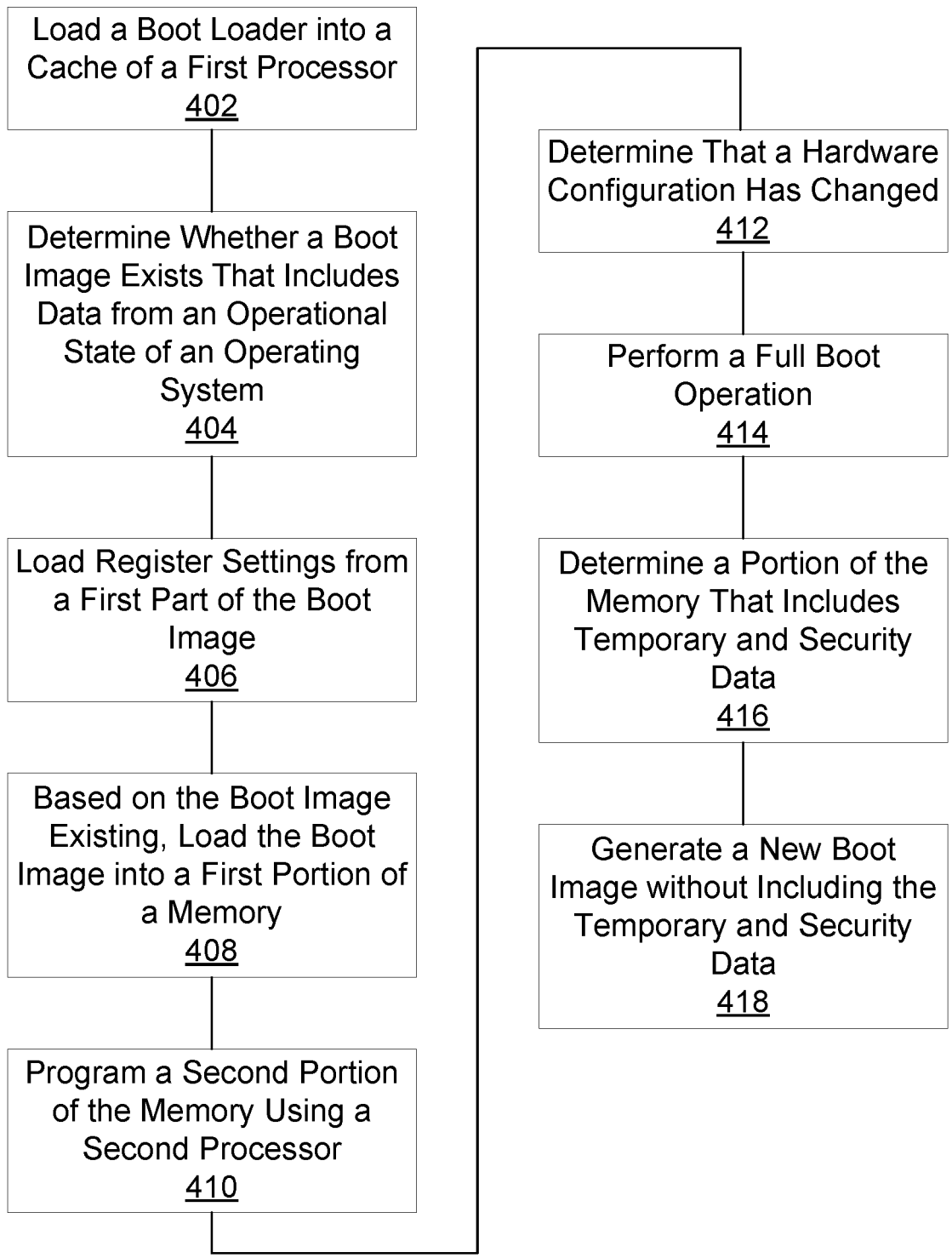
FIG. 4 is a flow diagram of another example method to quickly transition to an operational state.

FIG. 4 is a flow diagram of another example method 400 to quickly transition to an operational state (e.g., to quickly transition a printer to an operational state). At block 402, the method 400 may include loading a boot loader into a cache of a first processor. For example, the boot loader may be stored on a persistent storage device, such as a read-only memory, a hard drive, or the like. The boot loader may be copied from the persistent storage device to the cache of the first processor. In some examples, the boot loader may be copied to the cache without being copied to a memory, or the boot loader may be executed from the cache with portions of the boot loader in the memory being able to be overwritten.

Block 404 may include determining, using the boot loader executing on the first processor, whether a boot image exists that includes data from an operational state of an operating system. The boot image may include all data stored in main memory and used during operation of the operating system. The boot image may also include operational data for a BIOS, an application, or the like. The first processor may execute the boot loader out of the cache. For example, the boot loader may not exist in the memory or may be overwritten in the memory without disrupting execution of the boot loader. In an example, an indicator may be set if the boot image exists, so determining whether the boot image exists may include determining the value of the indicator. Determining whether the boot image exists may include reading data from a persistent storage device to determine whether the data includes the boot image. For example, the persistent storage device (e.g., predetermined locations on the persistent storage device, the entire persistent storage device, or the like) may be searched for the boot image.

Block 406 may include loading register settings from a first part of the boot image. For example, the boot image may include a first part, which may include data to configure the first processor, such as register settings. The register settings may be loaded into the first processor. Loading the register settings may include copying the register settings from the persistent storage device to relevant storage components in the first processor.

Block 408 may include, based on the boot image existing, loading the boot image into a first portion of the memory. For example, the boot image may include a second part, and the second part of the boot image may be loaded into the first portion of the memory. The boot image may be copied or moved from the persistent storage device to the first portion of the memory. For example, the boot loader, operating out of the processor cache, may copy the boot image to the first portion of the memory. Accordingly, the loading of the boot image into the memory may not interfere with operation of the boot loader.

At block 410, the method 400 may include programming a second portion of the memory using a second processor. For example, programming the second portion of the memory may include programming the second portion of the memory with a predetermined allocation structure using a dedicated circuit while loading the boot image. The first processor may indicate to the second processor to program the second portion based on determining the boot image exists, or the second processor may determine whether the boot image exists to determine whether to program the second portion of the memory. The second processor may include the dedicated circuit, which may program the second portion of the memory. The dedicated circuit may program the second portion of the memory based on its internal logic without copying or moving data to the second portion of the memory from another source. The logic in the dedicated circuit may determine how to layout the memory. Programming the second portion of the memory with the predetermined allocation structure may include allocating a predetermined amount of space in the memory with a predetermined structure, programming the allocated space with predetermined values, or the like. The second processor may program the second portion of the memory simultaneously with the first processor loading the boot image to the first portion of the memory. The first and second processor may negotiate usage of a shared bus to write data to the first and second portions of the memory.

At block 412, the method 400 may include determining that a hardware configuration has changed. For example, the hardware configuration may be checked after the booting, changes to the hardware configuration may be detected when they occur, or the like. The hardware configuration may include addition, modification, or removal of hardware, such as a printer tray. In some examples, modifications to software or firmware may be detected, for example, based on detecting installation of the update, comparing version numbers, comparing hashes, or the like.

Block 414 may include performing a full boot operation. For example, a reboot may be performed. During the reboot, the boot image may not be loaded into the first portion of the memory and the second portion may be programmed by the second processor. The data to populate the memory may be generated by executing instructions (e.g., boot loaders, OS instructions, application instructions, etc.). To cause performance of the full boot, an indication that the boot image exists may be cleared or deleted, or the boot image may be deleted.

Block 416 may include determining a portion of the memory that includes temporary and security data. For example, determining the portion of the memory may include receiving an indication of the portion of the memory (e.g., from an operating system or an application saving the temporary and security data), searching for the temporary and security data, determining the portion of the memory based on the location of BIOS data, operating system data, application data, etc. to be kept, or the like. The temporary and security data may include recent documents, recent print jobs, recent scan jobs, temporary settings, keys, tokens, or the like. An operational state may be reachable without the data. The temporary and security data may include data of interest to an attacker and for which security may be improved by not persistently storing the data.

At block 418, the method 400 may include generating a new boot image without including the portion of the memory including temporary and security data. Generating the new boot image may include generating a boot image including a portion of the data in the memory to be saved in the boot image and not including the portion of the memory that includes the temporary and security data. The portion of the data to be saved may include BIOS data, operating system data, application data, etc., such as data from an operational state of the BIOS, the operating system, or the application. Generating the new boot image may also include determining register settings to be included in the boot image. For example, the register settings may be included in a first part of the boot image, and the portion of the data in the memory to be saved may be included in a second part of the boot image. Generating the new boot image may include storing the new boot image in a persistent storage device. In an example, the non-transitory computer-readable medium 210 of FIG. 2 may be the memory, the boot engine 220 may perform blocks 402, 404, 406, 408, or 414; the configuration engine 230 may perform block 410; the generation engine 240 may perform blocks 412, 414, 416, or 418, and the persistent storage device 250 may be the persistent storage device.

Figure 5:
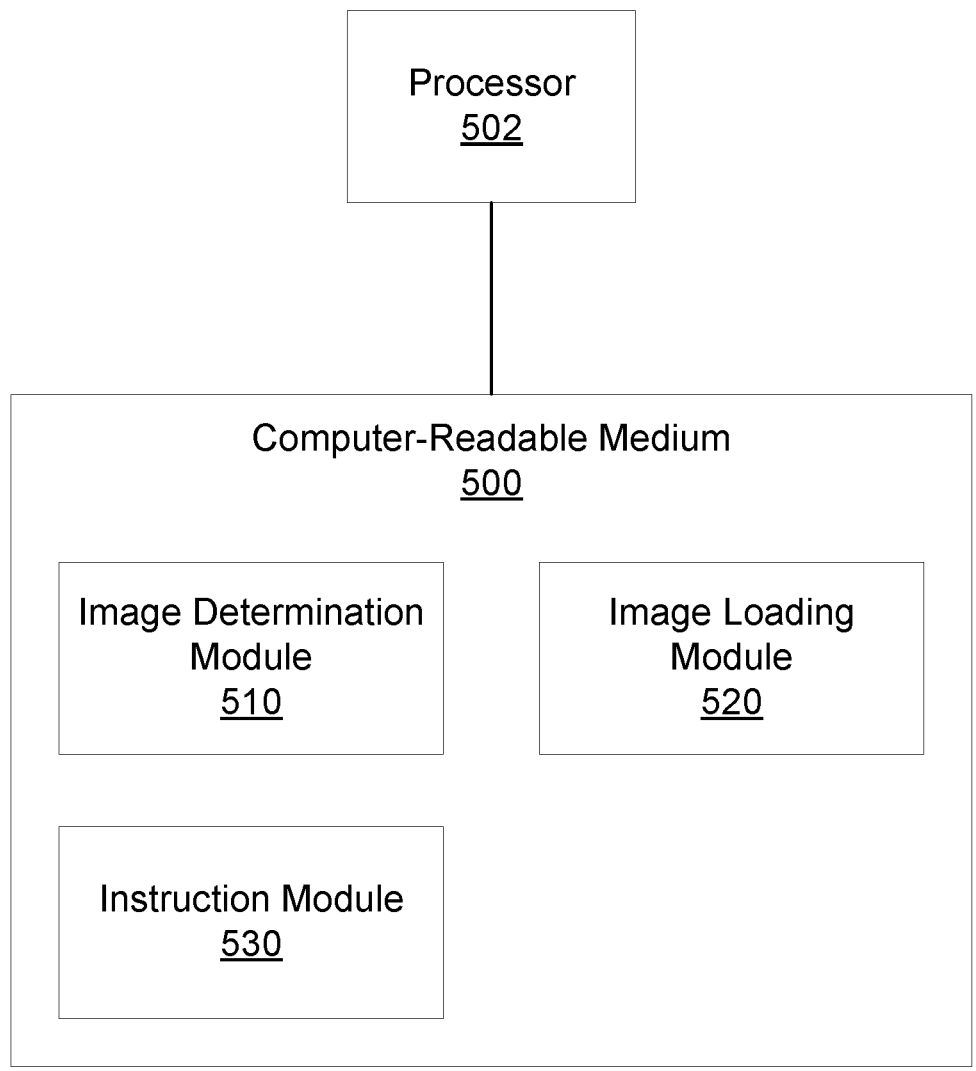
FIG. 5 is a block diagram of an example computer-readable medium including instructions that cause a first processor to quickly transition a system to an operational state.

FIG. 5 is a block diagram of an example computer-readable medium 500 including instructions that, when executed by a first processor 502, cause the first processor 502 to quickly transition a system to an operational state. The computer-readable medium 500 may be a non-transitory computer-readable medium. The first processor 502 may be a general purpose processor or special purpose logic, such as a microprocessor, a digital signal processor, a microcontroller, an ASIC, an FPGA, a PAL, a PLA, a PLD, etc. The computer-readable medium 500 may include an image determination module 510. As used herein, a "module" (in some examples referred to as a "software module") is a set of instructions that when executed or interpreted by a processor or stored at a processor-readable medium realizes a component or performs a method. The image determination module 510 may include instructions that, when executed, cause the first processor 502 to determine whether a boot image exists that includes data from an operational state of an operating system. For example, the image determination module 510 may cause the first processor 502 to detect an indication of whether the boot image exists, to search for the boot image itself, or the like.

The computer-readable medium 500 may also include an image loading module 520. The image loading module 520 may cause the first processor 502 to load the boot image into a first portion of a memory based on the boot image existing. For example, the image loading module 520 cause the first processor 502 to copy or move the boot image to the memory from a persistent storage device. In some examples, the computer-readable medium 500 may include the memory or the persistent storage device.

The computer-readable medium 500 may include an instruction module 530. The instruction module 530 may cause the first processor 502 to instruct a second processor to program a second portion of the memory with a predetermined allocation structure. For example, the instruction module 530 may cause the first processor 502 to indicate to the second processor whether or not the boot image exists, indicate whether or not to program the second portion of the memory, or the like. The second processor may program the second portion of the memory based on the indication. In an example, when executed by the first processor 502, the image determination module 510, the image loading module 520, or the instruction module 530 may realize the boot engine 120 of FIG. 1.

Figure 6:
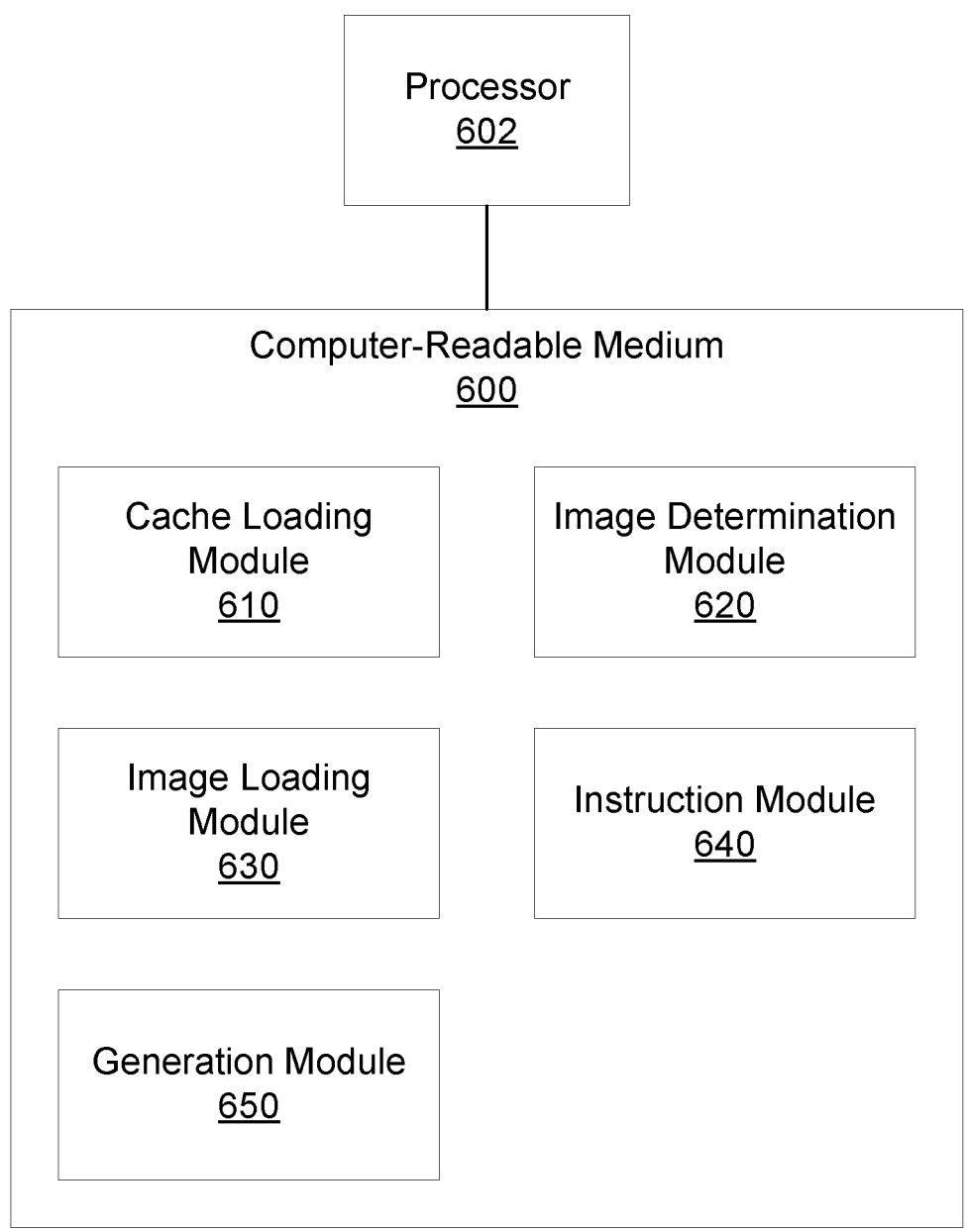
FIG. 6 is a block diagram of another example computer-readable medium including instructions that cause a first processor to quickly transition a system to an operational state.

FIG. 6 is a block diagram of another example computer-readable medium 600 including instructions that, when executed by a first processor 602, cause the first processor 602 to quickly transition a system, such as a printer, to an operational state. The computer-readable medium 600 may include a cache loading module 610. The cache loading module 610 may cause the first processor 602 to load a module to a cache of the first processor 602. The cache loading module 610 may cause the first processor 602 to operate the module out of the cache of the first processor 602. For example, the first processor 602 may retrieve the instructions from the module from the cache without retrieving the instructions from a main memory. The cache loading module 610 may cause the first processor 602 to load an image determination module 620, an image loading module 630, an instruction module 640, or a generation module 650 into the cache.

The computer-readable medium 600 may include the image determination module 620. The image determination module 620 may cause the first processor 602 to determine whether a boot image exists that includes data from an operational state of an operating system. For example, the boot image may include data used by the operating system, an application, a BIOS, or the like when in an operational state to maintain the operating system, the application, the BIOS, or the like in the operational state. The data from the operational state may include data generated by the BIOS, the operating system, or the application while booting and maintained in a main memory while the BIOS, the operating system, or the application is operating. The cache loading module 610 may cause the first processor 602 to load the image determination module 620 into the cache of the first processor 602, so the first processor 602 may operate out of the cache of the first processor 602 when determining whether the boot image exists.

The computer-readable medium 600 may include an image loading module 630. The image loading module 630 may cause the first processor 602 to load the boot image into a first portion of a memory based on the boot image existing. For example, in response to or after the image determination module 620 causes the first processor 602 to determine the boot image exists, the image loading module 630 may cause the first processor 602 to load the boot image into the first portion of the memory. The image loading module 630 may cause the first processor 602 to copy or move the boot image from a persistent storage device to the first portion of the memory. In an example, the image loading module 630 may cause the first processor 602 to load a second part of the boot image into the memory and load register settings from a first part of the boot image into the first processor 602.

The computer-readable medium 600 may include an instruction module 640. The instruction module 640 may cause the first processor 602 to instruct a second processor to program a second portion of the memory with a predetermined allocation structure. For example, the instruction module 640 may cause the first processor 602 to instruct the second processor to program the second portion based on, in response to, or after the image determination module 620 causes the first processor 602 to determine the boot image exists. The instruction module 640 may cause the first processor 602 to transmit an indication to the second processor to program the second portion, may clear a reset input to the second processor, or the like. The second processor may allocate space in the memory, may write values to the allocated space, or the like.

The image loading module 630 and the instruction module 640 may cause the first processor 602 to load the boot image into the first portion of the memory while the second processor programs the second portion of the memory with the predetermined allocation structure. For example, the instruction module 640 may cause the first processor 602 to instruct the second processor to program the second portion of the memory prior to or while the image loading module 630 causes the first processor 602 to load the boot image. While the image loading module 630 is causing the first processor 602 to load the boot image, the second processor may be responding to being instructed by programming the second portion of the memory.

The loading of the boot image into the first portion of the memory and the programming of the second portion may completely boot the operating system and the application, which may be executing on the operating system. For example, once the first processor 602 is finished loading the boot image and the second processor is finished programming the predetermined allocation structure, the operating system and the application may be operational without the image loading module 630 or another module causing the first processor 602 to execute additional instructions or without the second processor performing additional actions. In some examples, the computer-readable medium 600 may cause the first processor 602 or the second processor to perform additional actions before the loading of the boot image and the programming of the predetermined allocation structure completes the booting of the operating system and the application.

The computer-readable medium 600 may include a generation module 650. The generation module 650 may cause the first processor 602 to detect a change in a hardware configuration. The change in the hardware configuration may include the addition, removal, or modification of a hardware device, such as a printer tray. In some examples, the generation module 650 may cause the first processor 602 to detect an update to BIOS firmware or to operating system or application software. The generation module 650 may cause the first processor 602 to update the boot image based on the change in the hardware configuration. For example, the generation module 650 may cause the first processor 602 to generate a new boot image or update an existing boot image. The generation module 650 may cause the first processor 602 to perform a full boot of the system and update the boot image based on the state of the system after the full boot. Referring to FIG. 2, when executed by the first processor 602, the cache loading module 610, the image determination module 620, the image loading module 630, or the instruction module 640 may realize, e.g., the boot engine 220, and the generation module 650 may realize, e.g., the generation engine 240.

The above description is illustrative of various principles and implementations of the present disclosure. Numerous variations and modifications to the examples described herein are envisioned. Accordingly, the scope of the present application should be determined only by the following claims.

What is claimed is:

1. A printer comprising:
   a non-transitory computer-readable medium;
   a processor;
   a boot engine communicatively coupled to the non-transitory computer-readable medium and executable by the processor, the boot engine to load a boot image into a first portion of the non-transitory computer-readable medium, the boot image including data from an operational state of an operating system; and
   a configuration engine including a dedicated circuit different from the processor to program a second portion of the non-transitory computer-readable medium simultaneously with the processor executing the boot engine to load the boot image.

2. The printer of claim 1, wherein the configuration engine is to program the second portion of the non-transitory computer-readable medium with a predetermined allocation structure.

3. The printer of claim 1, wherein the boot image includes data from an operational state of an application, and wherein the boot engine and the configuration engine are to completely boot the operating system and the application by loading the boot image and programming the second portion of the non-transitory computer-readable medium.

4. The printer of claim 1, further comprising a generation engine to:
   detect a change in a hardware configuration of the printer;
   based on detection of the change:
   determine which data is included in the first portion and the second portion of the non-transitory computer-readable medium; and
   store data from the first portion of the non-transitory computer-readable medium to persistent storage as the boot image without storing data from the second portion of the non-transitory computer-readable to the boot image.

5. The printer of claim 1, wherein the boot engine is to operate out of a processor cache when loading the boot image into the first portion of the non-transitory computer-readable medium.

6. A method, comprising:
   loading a boot loader into a cache of a first processor;
   determining, using the boot loader executing on the first processor, whether a boot image exists that includes data from an operational state of an operating system;
   based on the boot image existing, loading the boot image into a first portion of a memory; and
   programming a second portion of the memory using a second processor simultaneously with the loading of the boot image into the first portion of the memory.

7. The method of claim 6, wherein the programming of the second portion using the second processor comprises programming the second portion with a predetermined allocation structure using a dedicated circuit.

8. The method of claim 6, further comprising:
   determining that a hardware configuration has changed;
   performing a full boot operation; and
   generating a new boot image.

9. The method of claim 8, wherein generating the new boot image comprises determining a portion of the memory that includes temporary and security data, and generating the new boot image without including the portion of the memory including temporary and security data.

10. The method of claim 6, further comprising loading register settings from a first part of the boot image, wherein a second part of the boot image is loaded into the first portion of the memory.

11. A non-transitory computer-readable medium comprising instructions that, when executed by a first processor, cause the first processor to:
    determine whether a boot image exists that includes data from an operational state of an operating system;
    based on the boot image existing, load the boot image into a first portion of a memory; and
    instruct a second processor to program a second portion of the memory with a predetermined allocation structure simultaneously with loading of the boot image into the first portion of the memory.

12. The computer-readable medium of claim 11, wherein the executed instructions cause the first processor to detect a change in a hardware configuration and update the boot image based on the change in the hardware configuration.

13. The computer-readable medium of claim 11, wherein the instructions are executed from a processor cache of the first processor when determining whether the boot image exists.

14. The computer-readable medium of claim 11, wherein the loading of the boot image in the first portion of the memory and programming of the second portion completely boot the operating system and an application executing on the operating system.

* * * * *